United States Patent [19]

Pettigrew

[11] Patent Number: 4,499,508
[45] Date of Patent: Feb. 12, 1985

[54] DIGITAL MAGNETIC RECORDING

[76] Inventor: Archibald M. Pettigrew, "West Glenn", West Glenn Rd., Kilmacolm, Renfrewshire, England

[21] Appl. No.: 349,845

[22] Filed: Feb. 18, 1982

[30] Foreign Application Priority Data

Feb. 20, 1981 [GB] United Kingdom ............... 8105396

[51] Int. Cl.³ .............................................. G11B 5/09
[52] U.S. Cl. ......................................... 360/41; 360/46
[58] Field of Search ............................ 360/41, 46, 67

[56] References Cited

U.S. PATENT DOCUMENTS 4,319,288 3/1982 Lee ........................................ 360/46

Primary Examiner—Vincent P. Canney

[57] ABSTRACT

In a system for retrieving data from a recording medium employing MFM or FM encoding forms, a decoding method and circuit employs the technique of delaying the third harmonic of the data signal relative to the fundamental of the data signal by 180 degrees. This delaying is effected by the use of two resonant networks each delaying the third harmonic relative to the fundamental by 90 degrees. The delaying technique enables a differentation stage to be eliminated.

9 Claims, 6 Drawing Figures

DIGITAL MAGNETIC RECORDING

This invention relates to a method of and to a circuit for improving digital magnetic recording.

In the recovery of digital data in magnetic recording, in which the most common encoding forms used are MFM or FM, the following stages are present:

(1) Obtain a voltage proportional to the rate of change of flux.
(2) Amplify and filter with a low pass Bessel type filter.
(3) Differentiate to change peaks to zero crossings.
(4) Obtain a digital pulse from every zero crossing.

As the gain in the differentiator stage is proportional to frequency, all white noise is increased resulting in a net loss of signal to noise ratio of approximately eight decibels.

It is an object of the present invention to obviate or mitigate this disadvantage. More particularly, it is an object of the present invention to provide a method of and a circuit for data recovery in digital magnetic recording wherein the above-mentioned differentiation stage may be eliminated.

According to the present invention there is provided a method of data recovery in digital magnetic recording, comprising the steps of deriving an information-carrying data signal from a recording medium, delaying the phase of the third harmonic of said data signal relative to the phase of the fundamental of said data signal by 180 degrees with reference to the frequency of said harmonic to produce a modified signal, and deriving a digital information-carrying pulse train from said modified signal wherein the delaying of said third harmonic is effected by passing the data signal through two resonant networks whose resonant frequency is the frequency of said third harmonic.

Preferably also, said resonant networks comprise resonant low pass filters.

Further according to the present invention there is provided a circuit for data recovery in digital magnetic recording comprising means for deriving an information-carrying data signal from a recording medium, means for delaying the phase of the third harmonic of said data signal relative to the phase of the fundamental of said data signal by 180 degrees with reference to the frequency of said third harmonic to produce a modified signal, and means for deriving an information-carrying pulse train from said modified signal, wherein said phase delaying means comprises two resonant networks whose resonant frequency is the frequency of said third harmonic.

Embodiments of the present invention will now be described, by way of example, with reference to the accompanying drawings, in which.

Figure 5:
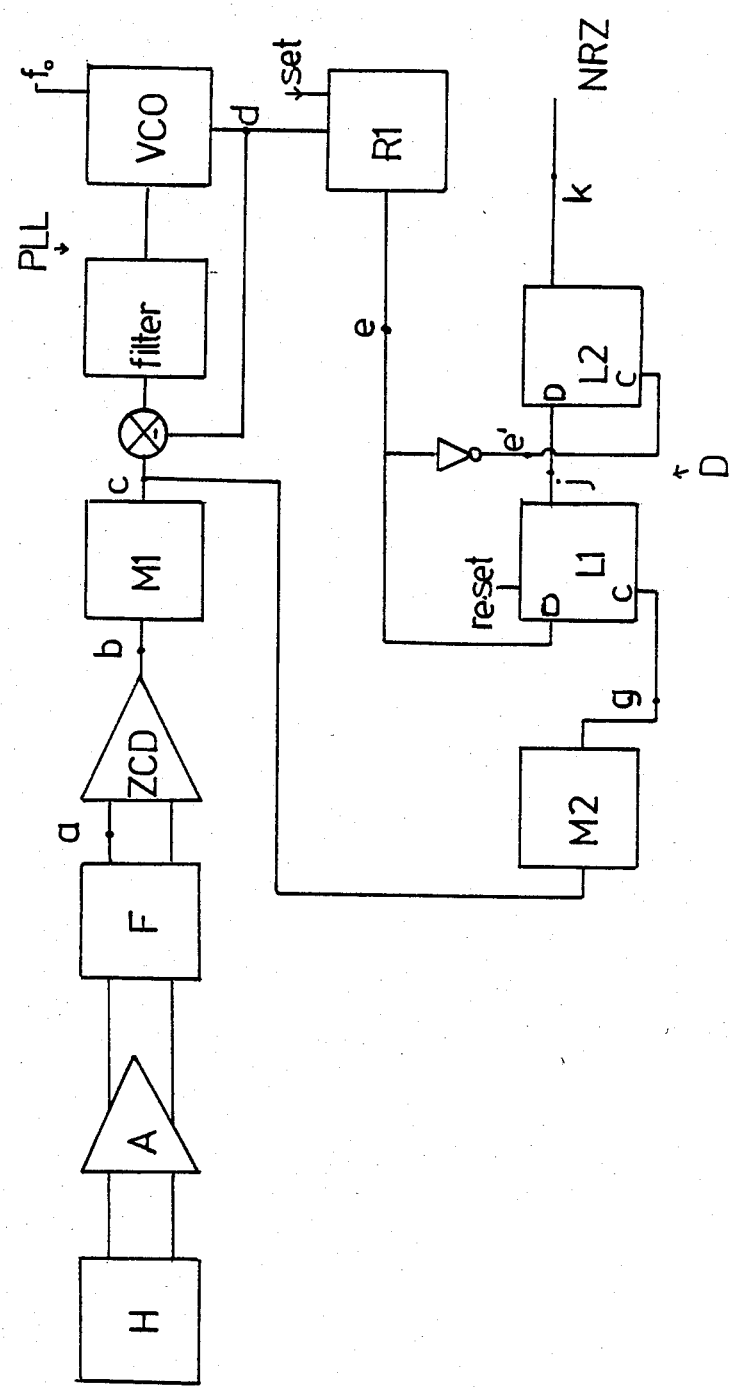
FIG. 5 is a circuit diagram of one embodiment of a complete MFM decoding circuit incorporating the present invention.
Figure 6:
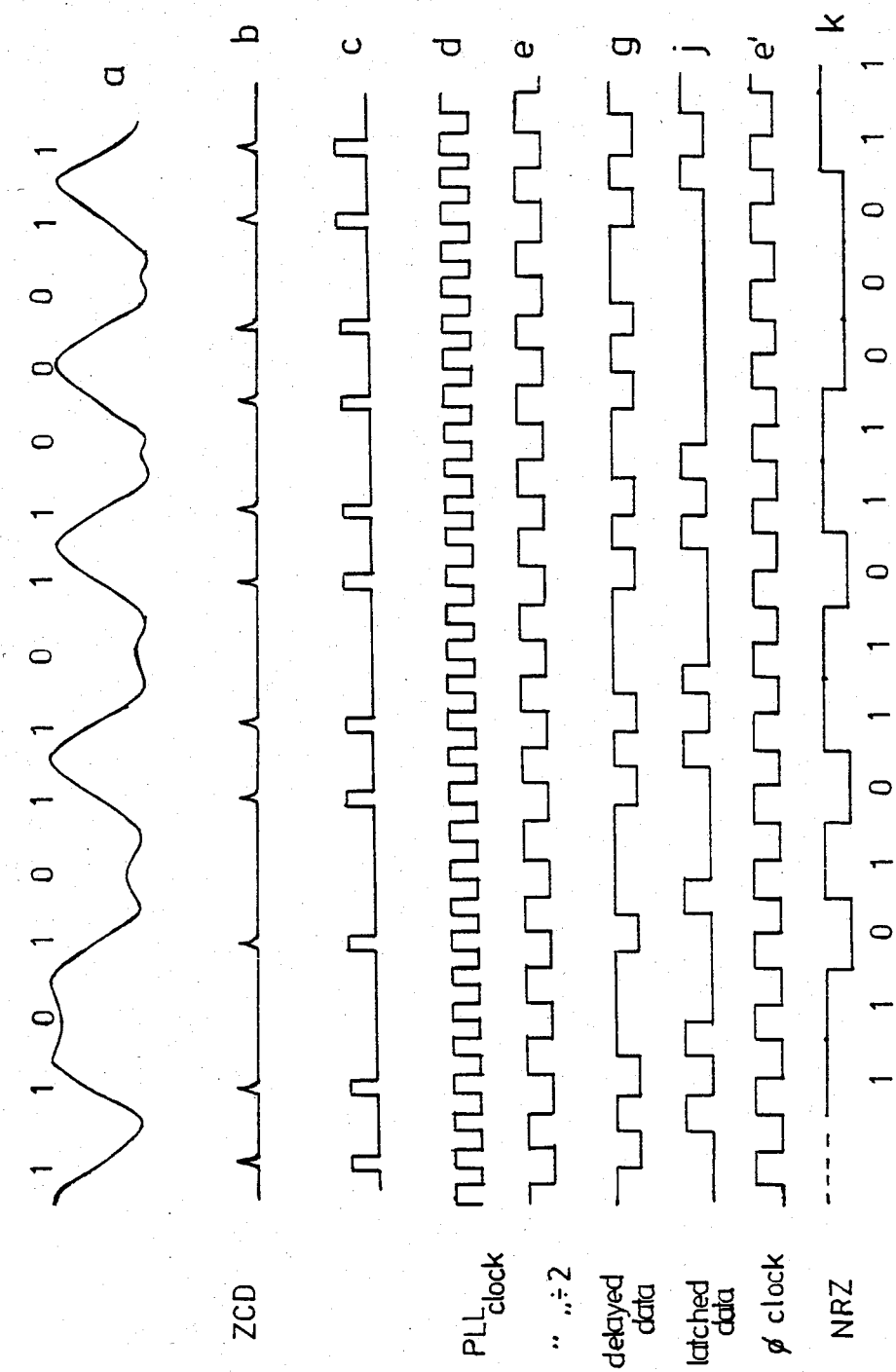
FIG. 6 illustrates the waveforms of the circuit of FIG. 5.

Referring to the drawings, and in particular FIGS. 5 and 6, a circuit for recovering data in digital magnetic recording includes a magnetic reading head H which reads information from a magnetic recording medium such as a disc or tape.

The signal derived from the head H is amplified in amplifer A and passed to a low pass filter F to give the waveform a shown in FIG. 6. The output of the filter F is passed to a zero crossing detector ZCD to give the pulse train shown by waveform b of FIG. 6, these pulses being passed to a first monostable M1 having a period of defined length to give waveform c.

The signal thereafter branches into two paths, the first of these paths being to recover a coherent clock signal. To this end the waveform c is applied to a phase lock PLL, the output signal d of the VCO of the PLL being passed to a square rooter R1 to generate a clock signal e at the correct frequency for application to a data window comparator D.

In its second path, the rising edge of the waveform c sets a variable period monostable M2 which in effect delays the signal before presentation to the data window comparator D for multiplication with the clock signal e.

The delayed data pulse from the monostable M2 (waveform g) is passed to a first inverted D-latch circuit L1 where it is multiplied with the clock signal e. As L1 is an inverted D-latch circuit the data pulse g is fed to the "clock" input of L1 whereas the clock signal e is fed to the "data" input, the output of L1 being a latched data signal j, thus on every rising edge of waveform g the output of L1 (j) is set to the value appearing at that instant on the data input i.e. if the value of clock waveform e is high at that instant, then the output j is set high and if the value of clock waveform e is low then the output j is set low. In the cases where j is set high it remains so till a reset pulse is fed to the "reset" input. The reset input can conveniently be derived from the system clock d, each rising edge of the waveform d resetting the output of L1 to zero.

The output of the inverted D-latch circuit L1 is synchronised in a second D-latch circuit L2 using the opposite phase of the system clock, that is waveform e' to give fully synchronised NRZ system output k. L2 is a normal D-latch circuit and thus the inverted clock signal e' is fed to the "clock" input of L2 and the latched data signal j is fed to the "data" input.

It will have been noted that the decoding technique just described does not include the differentiation stage prior to zero crossing detection, thus eliminating the loss of signal to noise ratio which occurs when such a differentiation stage is included. However, as the differentiation in effect alters the relative phase of the third harmonic of the data signal by 180 degrees relative to the phase of the fundamental, this phase difference has to be restored if the differentiation stage is to be eliminated.

This restoration of phase difference between the third harmonic and the fundamental is achieved by passing the head signal through two resonant networks whose resonant frequency is the frequency of the third harmonic.

The resonant networks may take the form of resonant filters or any other circuit which delays the third harmonic by 90 degrees relative to the fundamental.

In a preferred form one of the resonant networks is constituted by the reading head itself and the second network is constituted by a resonant filter.

Figure 1:
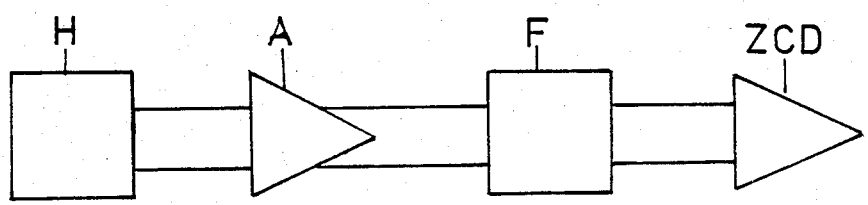
FIG. 1 is a circuit diagram of part of a data channel including one embodiment of a circuit made in accordance with the present invention.
Figure 2:
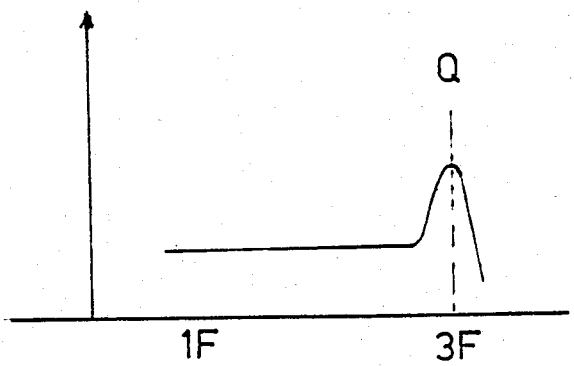
FIG. 2 illustrates the frequency spectrum of the resonant networks.
Figure 3:
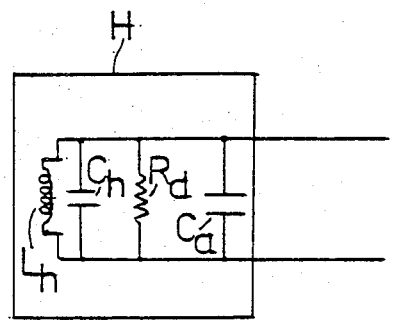
FIG. 3 illustrates in greater detail the design of the magnetic reading head of FIG. 1.

Referring to FIG. 3 there is shown in greater detail the electrical components of the head H of FIGS. 1 and 5. The inductance $L_h$ represents the given inductance of the turns of wire wound on the core and the head coil, by virtue of interaction of adjacent turns has a natural capacitance $C_h$. To these two components there is added an additional capacitance $C_a$ and a damping resistor $R_d$ such that the resonant frequency of the head coincides with the frequency of the third harmonic of the data signal derived from the magnetic medium. Thus the reading head constitutes a second order low pass filter having a resonance at the frequency of the third harmonic. At the frequency of the third harmonic, the effect of the resonance is to delay the phase of the third harmonic by 90 degrees relative to the phase of the fundamental.

Figure 4:
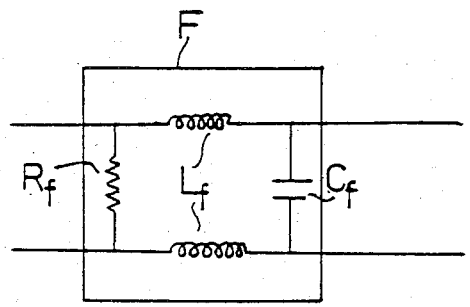
FIG. 4 illustrates in greater detail the design of the low pass filter of FIG. 1.

In FIG. 4, there is shown one design for the filter F of FIGS. 1 and 5. The filter F is a second order low pass filter having an inductance $L_f$ and capacitance $C_f$ and resistance $R_f$, the values of the components being chosen such that the filter F has a resonant frequency coinciding with the frequency of the third harmonic of the data signal derived from the magnetic medium. The filter F again delays the phase of the third harmonic by a further 90 degrees relative to the fundamental. Thus at the output of the filter F there is obtained a signal having a bandwidth extending from the fundamental frequency to the third harmonic. Also, in this signal the phase of the third harmonic has been delayed by 180 degrees relative to the phase of the fundamental. Further, the energy of the third harmonic has been increased, and by suitably adjusting the gain of the head H and filter F the relative amplitudes of the fundamental and the third harmonic can be optimised to reduce peak shift. It has been found that a third harmonic amplitude which is one third of the fundamental amplitude gives optimum results.

There has been provided an improved data recovery technique in which the differentiation stage has been eliminated thus reducing the white noise normally generated in this stage.

Modifications and improvements may be incorporated without departing from the scope of the invention.

What is claimed is:

1. A method of data recovery in digital magnetic recording, comprising the steps of deriving an information-carrying data signal from a recording medium, delaying the third harmonic of said data signal with respect to the fundamental of said data signal by one half period of said third harmonic to produce a modified signal, and deriving a digital information-carrying pulse train from said modified signal wherein the delaying of said third harmonic is effected by passing the data signal through two resonant networks whose resonant frequencies are equal to the frequency of said third harmonic.

2. A method as claimed in claim 1 wherein said resonant networks comprise resonant low pass filters.

3. A method as claimed in claim 1 wherein one of said resonant networks includes a magnetic reading head which derives said information-carrying data signal from said recording medium.

4. A method as claimed in claim 1 wherein one of said resonant networks is in the form of a second order low pass filter circuit.

5. A method as claimed in claim 1 and further including the step of decoding said information-carrying pulse train.

6. A circuit for data recovery in digital magnetic recording comprising means for deriving an information-carrying data signal from a recording medium, means for delaying the third harmonic of said data signal with respect to the fundamental of said data signal by one half period of said third harmonic to produce a modified signal, and means for deriving an information-carrying pulse train from said modified signal, wherein said delaying means comprises two resonant networks whose resonant frequencies are equal to the frequency of said third harmonic.

7. A circuit as claimed in claim 6 wherein said means for deriving data signal includes a magnetic reading head which forms part of one of said resonant networks.

8. A circuit as claimed in claim 6 wherein one of said resonant networks is in the form of a second order low pass filter circuit.

9. A circuit as claimed in claim 6 and further including means for decoding said information-carrying pulse train to obtain NRZ data.

* * * * *